United States Patent [19]

Ziegler et al.

[11] Patent Number: 5,386,367

[45] Date of Patent: Jan. 31, 1995

[54] METHOD FOR CYLINDER-SELECTIVE KNOCK CONTROL IN INTERNAL COMBUSTION ENGINES

[75] Inventors: Herbert Ziegler, Straubing; Peter Schindler, Landshut, both of Germany

[73] Assignee: Siemens Aktiengesellschaft, Munich, Germany

[21] Appl. No.: 706,248

[22] Filed: May 28, 1991

[30] Foreign Application Priority Data

May 28, 1990 [EP] European Pat. Off. ......... 90110083

[51] Int. Cl.$^6$ .............................................. F02P 5/14
[52] U.S. Cl. ........................... 364/431.08; 364/431.01; 364/431.03; 123/425; 123/435; 123/416; 123/417; 73/35
[58] Field of Search ............... 364/431.01–431.12; 123/425, 435, 416, 414, 417, 415; 73/35

[56] References Cited

U.S. PATENT DOCUMENTS

| | | | |
|---|---|---|---|
| 4,271,799 | 6/1981 | Kato et al. | 123/425 |
| 4,312,214 | 1/1982 | Kramer et al. | 73/35 |
| 4,345,558 | 8/1982 | Yamaguchi et al. | 123/425 |
| 4,991,553 | 2/1991 | Kurihara et al. | 123/425 |
| 5,040,510 | 8/1991 | Krebs et al. | 123/425 |
| 5,060,615 | 10/1991 | Hashimoto et al. | 123/425 |
| 5,083,278 | 1/1992 | Matsuura | 364/431.08 |
| 5,140,962 | 8/1992 | Inata | 123/425 |

FOREIGN PATENT DOCUMENTS

| | | |
|---|---|---|
| 0202978 | 11/1986 | European Pat. Off. . |
| 0346799 | 12/1989 | European Pat. Off. . |
| 0361057 | 4/1990 | European Pat. Off. . |
| 3434823 | 4/1986 | Germany . |

*Primary Examiner*—Kevin J. Teska
*Assistant Examiner*—Jacques Harold Louis-Jacques
*Attorney, Agent, or Firm*—Herbert L. Lerner; Laurence A. Greenberg

[57] ABSTRACT

The method includes sampling a sensor signal of at least one knocking sensor after amplification and preparation at a predetermined frequency within a measurement window being predetermined for each firing cycle, to form sampled values. A knocking value is determined from a mean value of a predetermined number of greatest sampled values. A noise value is ascertained by forming a sliding mean value from a predetermined number of previous knocking values. An actual noise value is formed from the cylinder-selective noise values. A command noise value being dependent on at least one noise-determining engine parameter is read out of a performance graph. A difference between or a ratio of the actual noise value and the command noise value is formed. The comparison is processed in a controller to produce a correction factor. The correction factor is linked with a pilot value being read out of a pilot performance graph and being dependent on at least one noise-determining engine parameter, to produce a total amplification factor for the sensor signal.

14 Claims, 1 Drawing Sheet

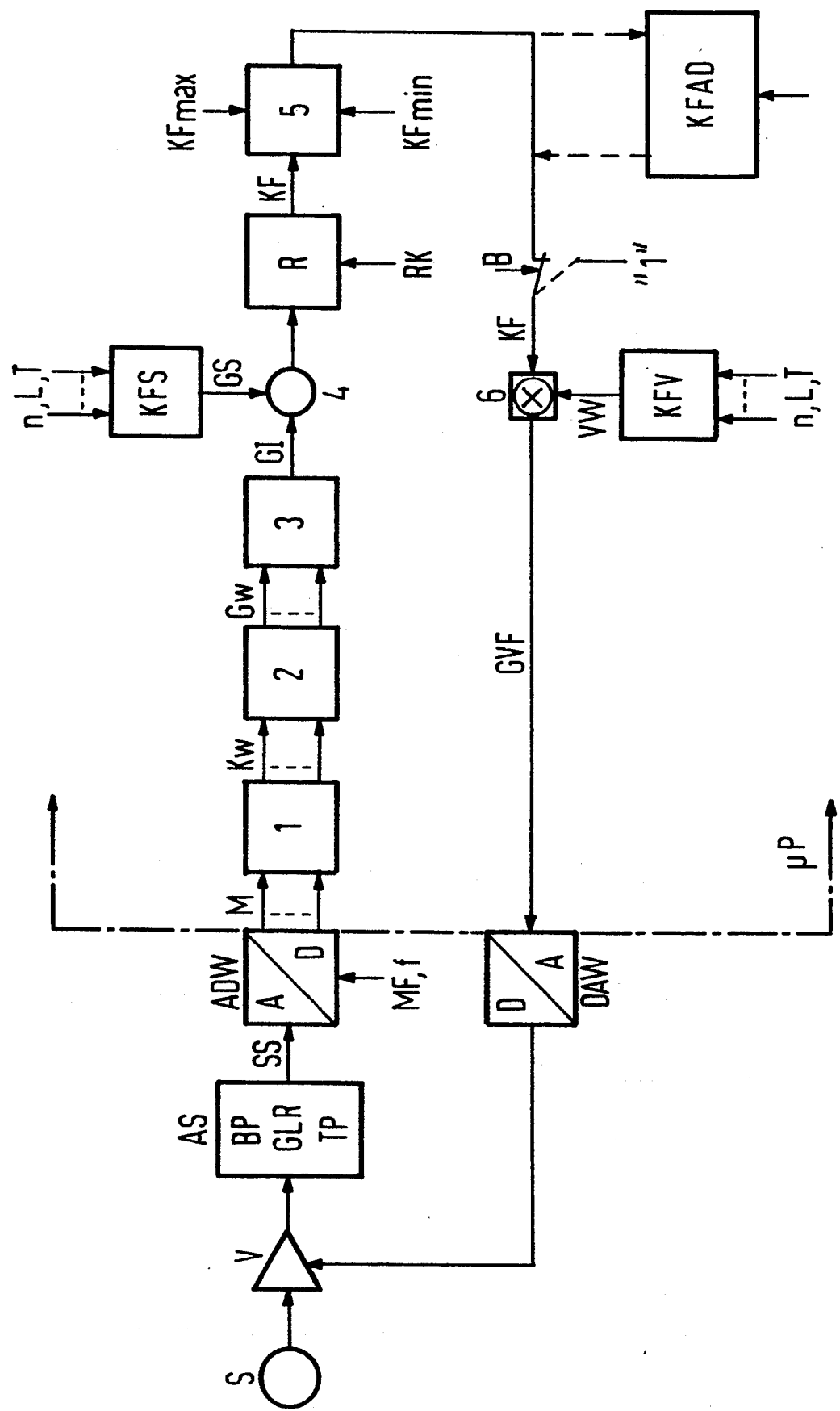

METHOD FOR CYLINDER-SELECTIVE KNOCK CONTROL IN INTERNAL COMBUSTION ENGINES

The invention relates to a method for cylinder-selective knock control in internal combustion engines, wherein a sensor signal of at least one knocking sensor is sampled after amplification and preparation at a predeterminable frequency within a measurement window being predeterminable for each firing cycle in order to form sampled values, a knocking value is determined from the mean value of a predeterminable number of greatest sampled values, and a noise value is ascertained by forming a sliding mean value from a predeterminable number of previous knocking values.

Such a method is described in U.S. application Ser. No. 528,228, filed May 23, 1990 now U.S. Pat. No. 5,040,510.

In the known method, the output signal of a knocking sensor is delivered, after amplification and preparation (such as with a bandpass filter, rectifier or low-pass filter), to an analog/digital (A/D) converter. The input signal of such an A/D converter must not exceed a predetermined voltage range or else it cannot be converted exactly into a digital value.

The size of the signal of a knocking sensor depends on many factors:
a) engine rpm,
b) engine load,
c) individual variation of engines in a mass-produced series,
d) engine aging,
e) tolerances of the knocking sensor,
f) tolerances of the cable harness,
g) tolerances in the evaluation electronics, and so forth.

The factors result in signal levels which vary over the entire input voltage range of an A/D converter, or go beyond it, or remain below the sensitivity threshold. It is therefore necessary to vary the amplification factor for the sensor signal.

One method for controlling the amplification factor for the sensor signal of an engine knock control is known from German Published, Non-Prosecuted Application DE 34 34 823 A1. in that method, the amplification factor for the sensor signal is controlled in accordance with the inverse of the amplified, prepared mean value of the sensor signal that is integrated inside the measuring window in which knocking is expressly not to occur, or in accordance with a value stored in a performance graph. With such a dependency of the amplification factor on low levels, peak knocking values may be outside the input range of the A/D converter or, in order to preclude it, the full amplification range cannot be used.

It is accordingly an object of the invention to provide a method for cylinder-selective knock control in internal combustion engines, which overcomes the hereinafore-mentioned disadvantages of the heretofore-known methods of this general type, which determines the amplification factor optimally in the known method for cylinder-selective knock control in internal combustion engines and which thus achieves sensitive knocking recognition and control.

With the foregoing and other objects in view there is provided, in accordance with the invention, a method for cylinder-selective knock control in internal combustion engines, which comprises sampling a sensor signal of at least one knocking sensor after amplification and preparation at a predeterminable frequency within a measurement window being predeterminable for each firing cycle, to form sampled values, determining a knocking value from a mean value of a predeterminable number of greatest sampled values, ascertaining a noise value by forming a sliding mean value from a predeterminable number of previous knocking values, forming an actual noise value from the cylinder-selective noise values, reading a command noise value being dependent on at least one noise-determining engine parameter out of a performance graph, forming a difference between or a ratio of the actual noise value and the command noise value, processing the comparison in a controller to produce a correction factor, and linking the correction factor with a pilot value being read out of a pilot performance graph and being dependent on at least one noise-determining engine parameter, to produce a total amplification factor for the sensor signal.

The basis being used is precisely the peak values of the sensor signal (which is supposed to be absolutely avoided in the method of German Published, Non-Prosecuted Application DE 34 34 823 A1), in order to control its amplification in such a way that it comes to be close to the upper limit of the input signal range of the A/D converter. The variations or tolerances listed above in categories c) to g) are thus largely compensated for.

In accordance with another mode of the invention, there is provided a method which comprises setting the actual noise value equal to the greatest or least cylinder-selective noise value.

In accordance with a further mode of the invention, there is provided a method which comprises setting the actual noise value equal to the greatest or least sensor-selective noise value.

In accordance with an added mode of the invention, there is provided a method which comprises setting the actual noise value equal to a mean value of all of the cylinder-selective noise values.

In accordance with an additional mode of the invention, there is provided a method which comprises predetermining a control speed of the controller in the form of an integral controller with a control constant.

In accordance with yet another mode of the invention, there is provided a method which comprises setting the correction factor to a value "1" in certain operating states of the engine.

In accordance with yet a further mode of the invention, there is provided a method which comprises limiting the correction factor to a range of values within predeterminable limit values.

In accordance with yet an added mode of the invention, there is provided a method which comprises storing the limited correction factor in an adaptive performance graph and preferably drawing it from it.

In accordance with a concomitant mode of the invention, there is provided a method which comprises forming the total amplification factor as a product of the pilot value and the correction factor.

Other features which are considered as characteristic for the invention are set forth in the appended claims.

Although the invention is illustrated and described herein as embodied in a method for cylinder-selective knock control in internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with accompanying drawings.

The drawing is a schematic and block circuit diagram of an apparatus for performing the method according to the invention.

Referring now to the single figure of the drawing in detail, there is seen a knocking sensor S (or a plurality of knocking sensors), disposed at a suitable point on a cylinder of an internal combustion engine. An output signal of the sensor is amplified in an amplifier V and prepared in a preparation circuit AS in order to produce a sensor signal SS. In the preparation circuit AS, the signal is filtered in a bandpass filter BP, rectified in a following rectifier GLR, and finally smoothed in a low-pass filter TP. The sensor signal SS is digitized in an A/D converter ADW and then further processed in a microprocessor $\mu P$.

The A/D converter is activated during a measuring window MF during each firing and during this period of time it samples the analog sensor signal SS at a predetermined frequency f and converts it into digital sampling values M.

Further processing is performed cylinder-selectively, in other words separately for each cylinder, in the microprocessor $\mu P$.

In a processor zone 1, a mean value is formed from a predetermined number of the largest sample values within each measurement window, and this mean value is applicable as a knocking value Kw for the preceding firing of the cylinder in question. This knocking value is the "averaged maximum sampled value" in the mixture combustion in a cylinder that follows the firing.

In a processor zone 2, a sliding mean value, which is a so-called noise value GW, is formed cylinder-selectively from a predetermined number of the most recent successive knocking values Kw.

The method described thus far corresponds to the known knock control method, in which the knocking values Kw and noise values GW are further processed.

The cylinder-selective noise values GW form the basis for ascertaining the amplification factor for amplification of the sensor signal SS in the amplifier V.

In a processor zone 3, a common actual noise value GI is formed from the cylinder-selective noise values GW. This is accomplished by determining the greatest or least cylinder-selective or sensor-selective noise value, or the mean value of all of the cylinder-selective noise values, as the actual noise value GI. Sensor-selective noise values are those that have been ascertained from cylinders that are associated with a certain sensor S. The noise values that are most suitable to form the actual noise value GI are ascertained empirically.

The actual noise value GI that has been determined is compared in a comparison stage 4 with a command, setpoint or desired noise value GS, which is taken from a performance graph or performance characteristics KFS, in which the command values are stored as a function of noise-determining engine parameters such as engine rpm n, engine load L, engine temperature T, and the like.

The result of the comparison, which in this example is the ratio between the actual and the command value GI/GS, is delivered as an input variable to a following controller R and processed therein to produce a correction factor KF. In this example, the controller is an integral controller, having a control speed which is variable by a predeterminable control constant RK.

In a limiting stage 5 following the controller R, the correction factor KF is limited to a range of values within predeterminable limit values KFmax and KFmin.

The thus-limited correction factor KF is then delivered to a linking unit 6, which in this exemplary embodiment is a multiplier, in which it is linked, in this case multiplied, with a pilot, pilot control or precontrol value VW. The pilot values VW, like the command noise values GS, are stored in a pilot performance graph or characteristics KFV as a function of the afore-mentioned noise-determining engine parameters.

The product of the pilot value VW and the correction factor KF forms a total amplification factor GVF, which appears at one output of the microprocessor $\mu p$, is converted into an analog value by a digital/analog converter DAW and is delivered to the amplifier V as a control variable for the amplification factor.

In certain operating states, for example when the engine is stopped, upon starting the engine, or if one or more knocking sensors are defective, the correction factor KF is set to the value "1". In other words, in such operating states it is only amplified by the pilot value VW. For this reason, a reversing switch is indicated in the line between the limiting stage 5 and the linking unit 6. In these operating states B it sets the correction factor KF to the value "1".

An adaptation performance graph or characteristics KFAD which is dependent on the engine operating point, is also provided for the correction factor KF. In the adaptation performance graph KFAD, the ascertained correction factors KF are inscribed and preferably drawn from it again in certain operating states, in a known manner.

We claim:

1. A method for cylinder-selective knock control in internal combustion engines, which comprises:

sampling a sensor signal of at least one knocking sensor after amplification and preparation at a predetermined frequency within a measurement window being predetermined for each firing cycle, to form sampled values, determining a knocking value from a mean value of a predetermined number of greatest sampled values, ascertaining a noise value by forming a sliding mean value from a predetermined number of previous knocking values, forming an actual noise value from the cylinder-selective noise values, reading a command noise value being dependent on at least one noise-determining engine parameter out of a performance graph, comparing the actual noise value and the command noise value, processing the comparison in a controller to produce a correction factor, and linking the correction factor with a pilot value being read out of a pilot performance graph and being dependent on at least one noise-determining engine parameter, to produce a total amplification factor for the sensor signal.

2. The method according to claim 1, which comprises performing the comparison step by forming a difference between the actual noise value and the command noise value.

3. The method according to claim 1, which comprises performing the comparison step by forming a ratio of the actual noise value and the command noise value.

4. The method according to claim 1, which comprises setting the actual noise value equal to the greatest cylinder-selective noise value.

5. The method according to claim 1, which comprises setting the actual noise value equal to the least cylinder-selective noise value.

6. The method according to claim 1, which comprises setting the actual noise value equal to the greatest sensor-selective noise value.

7. The method according to claim 1, which comprises setting the actual noise value equal to the least sensor-selective noise value.

8. The method according to claim 1, which comprises setting the actual noise value equal to a mean value of all of the cylinder-selective noise values.

9. The method according to claim 1, which comprises predetermining a control speed of the controller in the form of an integral controller with a control constant.

10. The method according to claim 1, which comprises setting the correction factor to a value "1" in certain operating states of the engine.

11. The method according to claim 1, which comprises limiting the correction factor to a range of values within predeterminable limit values.

12. The method according to claim 1, which comprises storing the limited correction factor in an adaptive performance graph.

13. The method according to claim 12, which comprises drawing the limited correction factor from the adaptive performance graph.

14. The method according to claim 1, which comprises forming the total amplification factor as a product of the pilot value and the correction factor.

* * * * *